US009137836B2

(12) United States Patent
Bontu et al.

(10) Patent No.: US 9,137,836 B2
(45) Date of Patent: Sep. 15, 2015

(54) INTER-DEVICE COMMUNICATION AUTHORIZATION AND DATA SNIFFING IN WIRELESS COMMUNICATION SYSTEMS (71) Applicant: RESEARCH IN MOTION LIMITED, Waterloo, Ontario (CA)

(72) Inventors: Chandra Sekhar Bontu, Kanata (CA); Yi Song, Irving, TX (US); Zhijun Cai, Irving, TX (US)

(73) Assignee: BlackBerry Limited, Waterloo, ON (CA)

( * ) Notice: Subject to any disclaimer, the term of this patent is extended or adjusted under 35 U.S.C. 154(b) by 205 days.

(21) Appl. No.: 13/652,011

(22) Filed: Oct. 15, 2012

(65) Prior Publication Data

US 2014/0106707 A1 Apr. 17, 2014

(51) Int. Cl.
*H04M 1/66* (2006.01)
*H04M 3/00* (2006.01)
(Continued)

(52) U.S. Cl.
CPC ....... *H04W 76/023* (2013.01); *H04L 2463/121* (2013.01); *H04W 12/02* (2013.01); *H04W 12/08* (2013.01)

(58) Field of Classification Search
CPC ........... H04M 1/66; H04M 2/16; H04M 1/00; H04M 11/00; H04W 4/00; H04W 12/00; H04W 12/02; H04W 12/08; H04W 76/02; H04W 76/023; H04W 8/005; H04W 8/20; H04W 12/14; H04W 8/26; H04W 88/06; H04W 48/16; H04W 74/004; H04W 24/00; H04W 36/0055; H04W 72/04; H04W 4/06; H04W 72/1278; H04B 7/00; H04B 1/00; H04B 1/38; H04H 20/71; H04J 3/26; H04L 12/56; H04L 29/06; H04L 9/32; H04L 1/18; G06F 15/16; H04K 1/00; H04N 7/167
USPC .................. 455/70, 72, 403, 410–411, 412.2, 455/414.1–414.3, 418–420, 434, 466, 514, 455/517, 550.1, 556.2, 560–561; 370/310, 370/312–313, 328, 349, 395.3, 395.5, 370/396.52, 432, 912–913; 709/0.202–203, 709/206, 211, 219, 228–229, 232, 237; 713/100, 150–155, 160–166, 168–170, 713/176, 181–182; 726/0.1–5, 14–15, 21, 726/26–30; 380/47, 269, 247–250, 380/239–242
See application file for complete search history.

(56) References Cited

U.S. PATENT DOCUMENTS 7,969,968 B2 * 6/2011 De Luca et al. ............... 370/352
(Continued)

FOREIGN PATENT DOCUMENTS

CN 102340829 2/2012
WO 00/27045 5/2000
(Continued)

OTHER PUBLICATIONS

International Search Report for Application No. PCT/US2013/026356, dated Jun. 26, 2013, 11 pages.
(Continued)

*Primary Examiner* — Meless Zewdu
(74) *Attorney, Agent, or Firm* — Fish & Richardson P.C.

(57) ABSTRACT

Systems and methods for user equipment (UE) for inter-device communication authorization and data sniffing in wireless communication systems are provided. A UE may communicate directly with another UE over a direct inter-device communication link when they are located in proximity. The UE may receive data sniffing related parameters corresponding to the inter-device communication link from a network entity, e.g. a mobile management entity (MME). The UE may store data exchanged over the inter-device communication link in a buffer and upload the stored data to a secure server in a network periodically or upon receiving a request from the network. Long term evolution (LTE) downlink or uplink radio resources may be used for the data exchange over the inter-device communication link.

44 Claims, 4 Drawing Sheets (51) Int. Cl.
*H04W 4/00* (2009.01)
*H04W 76/02* (2009.01)
*H04W 12/02* (2009.01)
*H04W 12/08* (2009.01)

(56) References Cited

U.S. PATENT DOCUMENTS

| | | | |
|---|---|---|---|
| 8,515,500 B2 | 8/2013 | Das et al. | |
| 8,582,593 B2 | 11/2013 | Chen et al. | |
| 8,631,466 B2* | 1/2014 | Cha et al. | 726/3 |
| 8,649,809 B2* | 2/2014 | Robke et al. | 455/466 |
| 2002/0111144 A1 | 8/2002 | Schiff | |
| 2004/0202295 A1* | 10/2004 | Shen et al. | 379/112.01 |
| 2004/0209634 A1 | 10/2004 | Hrastar | |
| 2005/0026597 A1 | 2/2005 | Kim et al. | |
| 2005/0111383 A1 | 5/2005 | Grob et al. | |
| 2005/0239451 A1 | 10/2005 | Periyalwar et al. | |
| 2006/0075263 A1* | 4/2006 | Taylor | 713/194 |
| 2006/0190470 A1* | 8/2006 | Lemnotis | 707/101 |
| 2007/0129076 A1 | 6/2007 | Cho et al. | |
| 2008/0002658 A1 | 1/2008 | Soliman | |
| 2008/0069063 A1 | 3/2008 | Li et al. | |
| 2009/0075630 A1* | 3/2009 | McLean | 455/411 |
| 2009/0119776 A1 | 5/2009 | Palnitkar et al. | |
| 2009/0130984 A1* | 5/2009 | Lee | 455/67.11 |
| 2010/0009675 A1 | 1/2010 | Wijting et al. | |
| 2010/0095123 A1* | 4/2010 | He | 713/171 |
| 2010/0240312 A1 | 9/2010 | Peng et al. | |
| 2010/0279672 A1 | 11/2010 | Koskela et al. | |
| 2011/0081908 A1 | 4/2011 | Michaelis et al. | |
| 2011/0143771 A1* | 6/2011 | Edge et al. | 455/456.1 |
| 2011/0145421 A1 | 6/2011 | Yao et al. | |
| 2011/0147462 A1 | 6/2011 | Speich | |
| 2011/0159799 A1 | 6/2011 | Chen et al. | |
| 2011/0194530 A1 | 8/2011 | Tinnakornsrisuphap et al. | |
| 2011/0258313 A1 | 10/2011 | Mallik et al. | |
| 2011/0268004 A1 | 11/2011 | Doppler et al. | |
| 2011/0275382 A1* | 11/2011 | Hakola et al. | 455/452.2 |
| 2011/0294474 A1 | 12/2011 | Barany et al. | |
| 2011/0317569 A1 | 12/2011 | Kneckt et al. | |
| 2012/0026971 A1* | 2/2012 | Khandelia et al. | 370/331 |
| 2012/0051315 A1 | 3/2012 | Wang et al. | |
| 2012/0163235 A1 | 6/2012 | Ho et al. | |
| 2012/0163252 A1 | 6/2012 | Ahn et al. | |
| 2012/0179789 A1* | 7/2012 | Griot et al. | 709/220 |
| 2012/0240216 A1* | 9/2012 | Fernandez Gutierrez | 726/14 |
| 2013/0003629 A1 | 1/2013 | Jeong et al. | |
| 2013/0159522 A1* | 6/2013 | Hakola et al. | 709/225 |
| 2013/0160101 A1* | 6/2013 | Hakola et al. | 726/7 |
| 2013/0315196 A1 | 11/2013 | Lim et al. | |
| 2013/0329689 A1 | 12/2013 | Choi et al. | |
| 2014/0004796 A1* | 1/2014 | Cakulev et al. | 455/41.2 |
| 2014/0010175 A1 | 1/2014 | Chiu | |
| 2014/0078952 A1 | 3/2014 | Bontu et al. | |
| 2014/0078971 A1 | 3/2014 | Bontu et al. | |
| 2014/0086152 A1 | 3/2014 | Bontu et al. | |
| 2014/0086153 A1 | 3/2014 | Bontu et al. | |
| 2014/0086157 A1 | 3/2014 | Bontu et al. | |
| 2014/0122607 A1 | 5/2014 | Fodor et al. | |
| 2014/0140296 A1 | 5/2014 | Choi et al. | |
| 2014/0153390 A1 | 6/2014 | Ishii et al. | |

FOREIGN PATENT DOCUMENTS

| | | |
|---|---|---|
| WO | 2009/138820 | 11/2009 |
| WO | 2010/007498 | 1/2010 |
| WO | 2010/059856 | 5/2010 |
| WO | 2011/036507 | 3/2011 |
| WO | 2011/147462 | 12/2011 |
| WO | 2012052911 | 4/2012 |
| WO | 2012/088470 | 6/2012 |

OTHER PUBLICATIONS

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).

3GPP TS 36.211 V10.3.0 (Sep. 2011) Technical Specification: Evolved Universal Terrestrial Radio Access (E-UTRA); Physical Channels and Modulation (Release 10).

3GPP TS 36.212 V10.1.0 (Mar. 2011) Technical Specification: Evolved Universal Terrestrial Radio Access (E-UTRA); Multiplexing and channel coding (Release 10).

3GPP TS 36.213 V10.1.0 (Mar. 2011) Technical Specification: Evolved Universal Terrestrial Radio Access (E-UTRA); Physical layer procedures (Release 10).

3GPP TS 36.331 V10.1.0 (Mar. 2011) Technical Specification: Evolved Universal Terrestrial Radio Access (E-UTRA); Radio Resource Control (RRC); Protocol specification (Release 10).

3GPP Standard; 3GPP TS 36.331,V11.1.0; 3rd Generation Partnership Project; Technical Specification Group Radio Access Network; Evolved Universal Terrestrial Radio Access (E-UTRA); Radio Resource Control (RRC); Protocol specification (Release 11); Sep. 2012; 325 pages.

Fodor et al., "Design Aspects of Network Assisted Device-to-Device Communications" IEEE Communications Magazine, IEEE Service Center, Piscataway, US, vol. 50, No. 3, Mar. 1, 2012, pp. 170-177; 8 pages.

Lei Lei et al: "Operator controlled device-to-device communications in LTE-advanced networks", IEEE Wireless Communications, IEEE Service Center, Piscataway, NJ, US, vol. 19, No. 3, Jun. 2012; 9 pages.

Intel: "Pro se Use Case for Unidirectional D2D Communication", A 3GPP Draft; S1-120065; 3GPP TSG-SA WG1, Meeting #57; Kyoto, Japan; Feb. 2012; 3 pages.

Intel: "Operator Managed and Operator Assisted D2D", 3GPP Draft; S1-120063; 3GPP TSG-SA WG1; Meeting #57, Kyoto, Japan; Feb. 2012 ; 4 pages.

Office Action issued in U.S. Appl. No. 13/621,703 on Nov. 19, 2014.

Office Action issued in U.S. Appl. No. 13/624,736 on Aug. 27, 2014; 14 pages.

International Search Report for Application No. PCT/US2013/026157, dated Jul. 30, 2013, 24 pages.

International Search Report for Application No. PCT/US2013/026174, dated Jul. 17, 2013, 5 pages.

International Search Report for Application No. PCT/US2013/026372, dated Apr. 24, 2013, 3 pages.

International Search Report for Application No. PCT/US2013/026104, dated Jun. 24, 2013, 3 pages.

International Search Report for Application No. PCT/US2013/026382, dated Jul. 11, 2013, 5 pages.

Search Report issued in TW Application No. 102132479 on Nov. 7, 2014, 1 page.

United States Office Action in U.S. Appl. No. 13/627,647, dated Mar. 13, 2015, 38 pages.

International Preliminary Report on Patentability in International Application No. PCT/US2013/026174, dated Apr. 2, 2015, 13 pages.

Taiwanese Office Action and Search Report in Taiwanese Application No. 102132478, dated Jan. 22, 2015, 11 pages.

Office Action and Search Report issued in TW Application No. 102132483 on Dec. 25, 2014; 8 pages.

Office Action and Search Report issued in Taiwanese Application No. 102132482 on Dec. 26, 2014; 9 pages.

Office Action and Search Report issued in Taiwanese Application No. 102132487 on Dec. 26, 2014; 12 pages.

* cited by examiner

INTER-DEVICE COMMUNICATION AUTHORIZATION AND DATA SNIFFING IN WIRELESS COMMUNICATION SYSTEMS

TECHNICAL FIELD

The present disclosure generally relates to communications in wireless communication systems, and more particularly, to inter-device communication authorization and data sniffing in wireless communication systems.

BACKGROUND

In wireless networks such as Long Term Evolution (LTE) and LTE-Advanced communication networks, a user equipment (UE) may communicate with other UEs via a base station and an evolved packet core (EPC) network. For example, a UE may send data packets to its serving base station on an uplink. The serving base station may forward the data packets to the EPC network and the EPC network may forward the data packet to another base station or to the same base station that is serving another UE. Data transfer between the UEs is routed through the base station and the EPC. The communication between the UEs is controlled by the policies set by the operator administering the network.

The UEs may communicate directly with each other using other radio access technology (RAT), such as, wireless local area network (WLAN) or Bluetooth when the UEs are located in close proximity and have access to the other RAT. However, this multi-RAT communication requires the availability of the other RAT and the capability of the UEs to operate in the other RAT. Moreover, handover from cellular technology to other RATs may result in service interruption and dropped calls.

BRIEF DESCRIPTION OF THE DRAWINGS

The accompanying drawings, which are incorporated in and constitute part of this specification, and together with the description, illustrate and serve to explain various examples.

DETAILED DESCRIPTION

The present disclosure is directed to systems, methods, and apparatuses for inter-device communication in cellular wireless communication systems. In the current cellular communication system, data transfer between UEs has to be routed through a base station and a core network. When UEs located in close proximity communicate with each other, it would be advantageous for the UEs to communicate via a direct inter-device communication link between them, instead of transferring the data via a network. By providing a direct inter-device communication link between the UEs, improved overall spectral efficiency may be achieved. Moreover, the direct link between the UEs requires lower transmit power at the UE compared to transmitting to the base station, thereby resulting in battery savings at the UEs. Additionally, communicating over the direct link between the UEs may improve quality of service (QoS).

Although the UE may be able to communicate over a direct communication link using another RAT, such as, WLAN, Bluetooth, etc., it requires availability of the services of the other RAT and also requires implementation of the other RAT at the UE. Furthermore, service interruptions and dropped calls may result from switching or handover between different RATs. Therefore, it may be advantageous to enable communications over the inter-device communication link using the same cellular radio access technology and operating in the same radio band.

Reference will now be made in detail to example approaches implemented according to the disclosure; the examples are illustrated in the accompanying drawings. Wherever possible, the same reference numbers will be used throughout the drawings to refer to the same or like parts.

Figure 1:
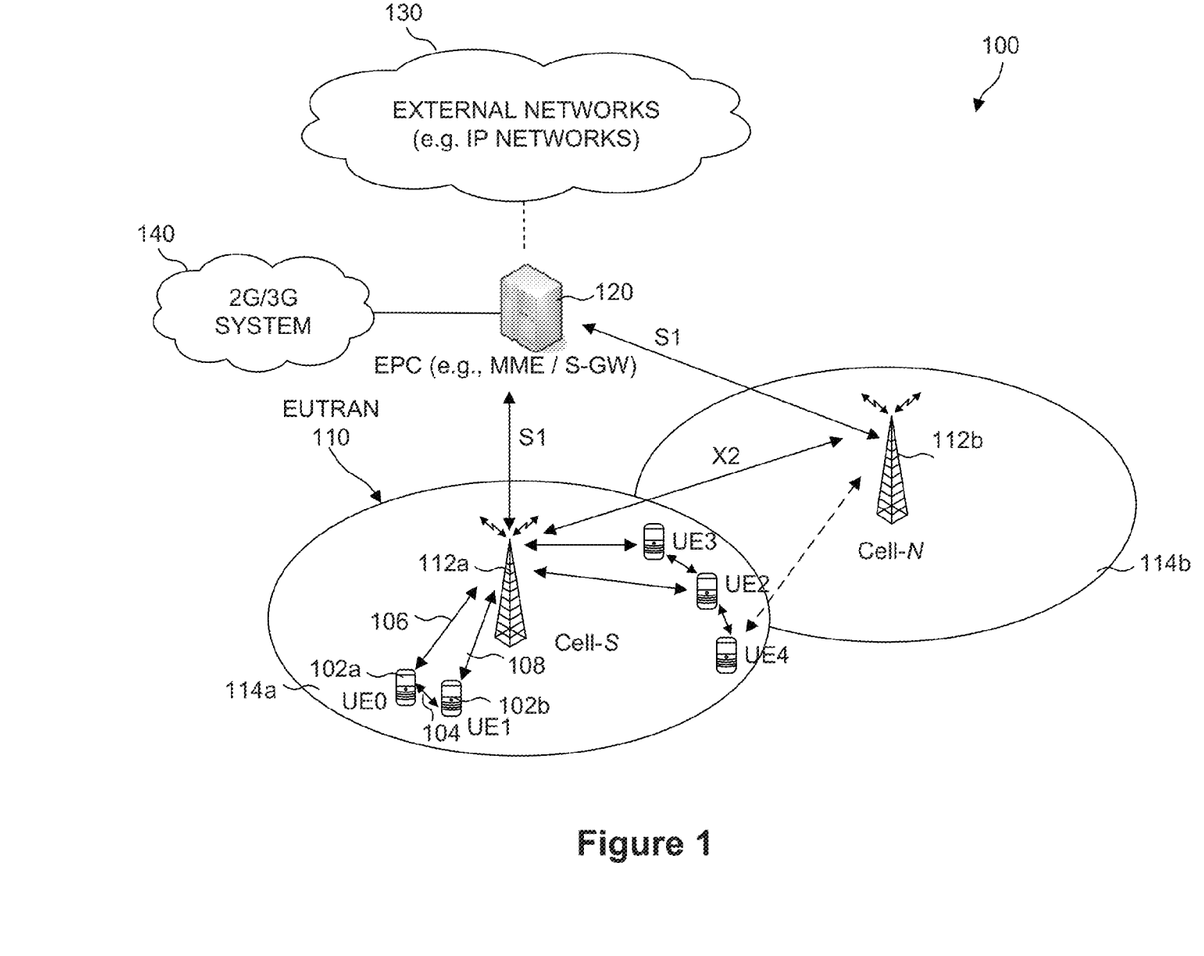
FIG. 1 illustrates an example cellular wireless communication system in which methods and systems consistent with the present disclosure may be implemented.

FIG. 1 illustrates an example cellular wireless communication system 100 in which systems and methods consistent with this disclosure may be implemented. The cellular network system 100 shown in FIG. 1 includes one or more base stations (i.e., 112a and 112b). In the LTE example of FIG. 1, the base stations are shown as evolved Node Bs (eNBs) 112a and 112b, although base stations operate in any wireless communications system, including for example, macro cell, femto cell, relay cell, and pico cell. Base stations are nodes that can relay signals for mobile devices, also referred to herein as user equipment, or for other base stations. The base stations are also referred to as access node devices. The example LTE telecommunications environment 100 of FIG. 1 includes one or more radio access networks 110, core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown, one or more mobile electronic devices 102a, 102b operate within the LTE system 100. In some implementations, 2G/3G systems 140, e.g., Global System for Mobile communication (GSM), Interim Standard 95 (IS-95), Universal Mobile Telecommunications System (UMTS) and Code Division Multiple Access (CDMA2000) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. User equipment (UEs) 102a and 102b operate in Cell 114a and are served by eNB 112a. The EUTRAN 110 can include one or more eNBs (e.g., eNB 112a and eNB 112b) and one or more UEs (e.g., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected to one serving eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b such that handover may be conducted if one or both of the UEs 102a and 102b travels, e.g., from cell 114a to cell 114b.

The UEs 102a and 102b may be any wireless electronic device used by an end-user to communicate, for example, within the LTE system 100.

The UEs 102a and 102b may transmit voice, video, multimedia, text, web content and/or any other user/client-specific content. The transmission of some content, e.g., video and web content, may require high channel throughput to satisfy the end-user demand. In some instances, however, the channel between UEs 102a, 102b and eNBs 112a, 112b may be contaminated by multipath fading due to the multiple signal paths arising from many reflections in the wireless environment. Accordingly, the UEs' transmission may adapt to the wireless environment. In short, the UEs 102a and 102b may generate requests, send responses or otherwise communicate in different means with Evolved Packet Core (EPC) 120 and/or Internet Protocol (IP) networks 130 through one or more eNBs 112a and 112b.

In some implementations, the UEs 102a and 102b may communicate over an inter-device communication link when they are located in close proximity to one another, without routing the data through the eNB 112a. The boundary of the distance of the inter-device communication link may be limited by the transmission power of the UEs. In one example, close proximity could be a few meters. In another example, close proximity could be tens of meters. It is also possible that in certain circumstances, the close proximity may mean larger distance such as hundreds of meters. For example, the UEs 102a and 102b may communicate directly over the inter-device communication link 104, instead of communicating with each other through their links with the eNB 112a, i.e., 106 and 108 respectively. The inter-device communication link may also be referred to as a device-to-device (D2D) communication link. The UEs 102a and 102b may simultaneously maintain an active communication link with the eNB 112a such that the UEs 102a and 102b may still receive messages from the eNB or other UEs, when communicating with each other over the direct inter-device link.

Examples of UEs include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as Universal Mobile Telecommunications System (UMTS), CDMA2000 and 3rd Generation Partnership Project (3GPP) LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all, or at least some, radio related functions in a fixed part of the system. One or more of eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b may directly communicate with one or more UEs 102a, 102b, other eNBs, and the EPC 120.

The eNBs 112a and 112b may be the end point of the radio protocols towards the UEs 102a, 102b and may relay signals between the radio connection and the connectivity towards the EPC 120. The communication interface between the eNB and the EPC is often referred to as an S1 interface. In certain implementations, EPC 120 is a central component of a core network (CN). The CN can be a backbone network, which may be a central part of the telecommunications system. The EPC 120 can include a mobility management entity (MME), a serving gateway (S-GW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The S-GW functions may include user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different locations in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
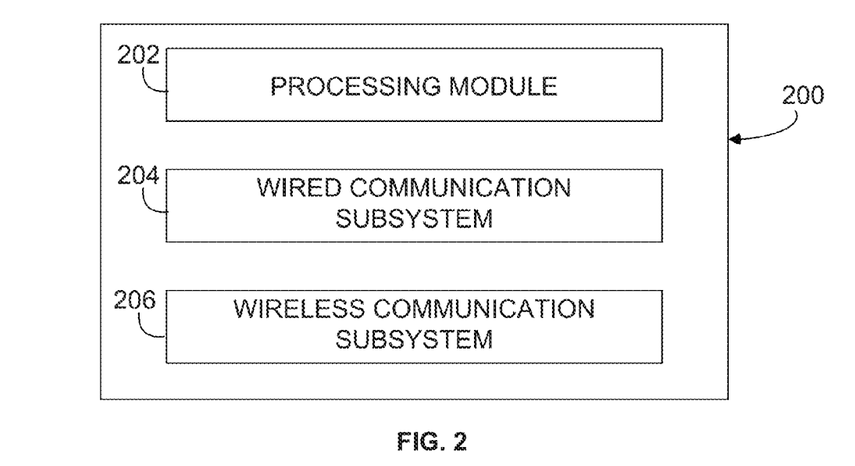
FIG. 2 illustrates an example access node device, in accordance with an example of the present disclosure.

FIG. 2 illustrates an example access node device 200 consistent with certain aspects of this disclosure. The access node device 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing IDC interference. The processing module 202 can also include other auxiliary components, such as random access memory (RAM), read only memory (ROM), secondary storage (for example, a hard disk drive or flash memory). Additionally, the processing module 202 can execute certain instructions and commands to provide wireless or wired communication, using the wired communication subsystem 204 or a wireless communication subsystem 206. One skilled in the art will readily appreciate that various other components can also be included in the example access node device 200 without departing from the principles of the present disclosure.

Figure 3:
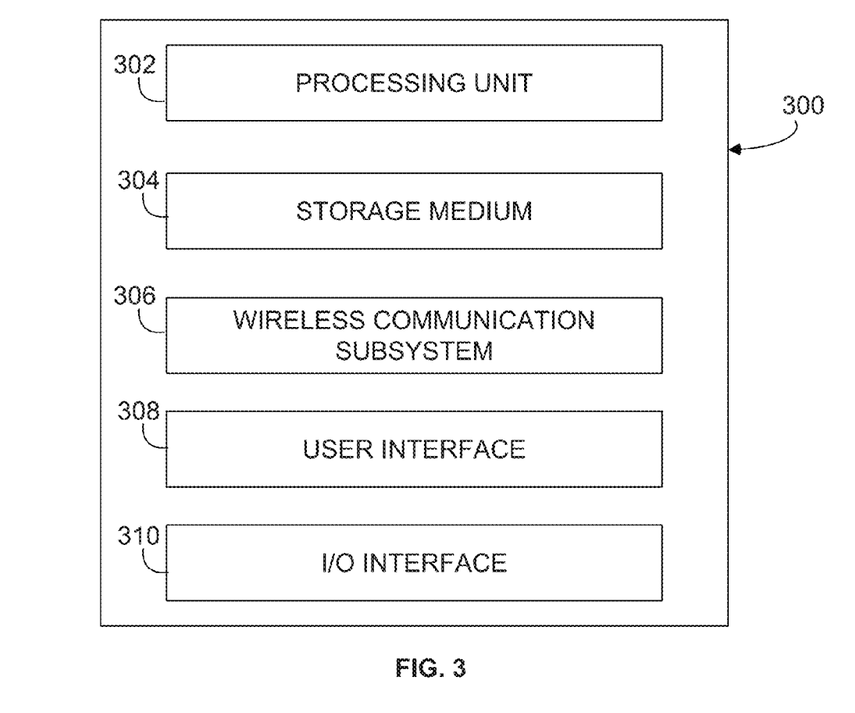
FIG. 3 illustrates an example user equipment device, in accordance with an example of the present disclosure.

FIG. 3 illustrates an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 may include components and perform functionality similar to the processing module 202 described with regard to FIG. 2. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the wireless communication subsystem 306 may receive or transmit information over a direct inter-device communication link. In some implementations, the wireless communication subsystem 306 can support MIMO transmissions.

The user interface 308 can include, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone).

The I/O interface 310 can include, for example, a universal serial bus (USB) interface. One skilled in the art will readily appreciate that various other components can also be included in the example UE device 300.

For UEs to communicate over a direct inter-device communication link, an inter-device communication link is enabled between the UEs. The direct inter-device communication link allows data exchange between the UEs, without routing the data through the base station and the core network. Descriptions will now be made about methods for the inter-device communication authorization and data sniffing in the wireless communication system, according to certain examples of the present disclosure.

During an inter-device communication, a UE may maintain an active link with its serving eNB or an associated eNB and simultaneously communicate with the eNB while communicating with other UEs over the inter-device link. As will be described later, this simultaneous communication enables the network to establish a secure communication link between the UEs to sniff data packets exchanged over the direct inter-device communication link for selective data monitoring.

The inter-device communication capability may be assigned by a network operator, e.g., with an approval from an appointed authority. For example, such an authority may be a government agency, such as homeland security/ministry of defense based on the jurisdiction. The appointed authority may also be an employer who supplies devices to the employees. The network can sniff data exchanged over the inter-device link from an on-going inter-device communication link or from data transmitted over a previously established inter-device call when necessary. The sniffed data may be loaded to a network server for further evaluation by the authority. The data sniffing function can be enabled by the network without knowledge of the user using the device. This process of data sniffing may be authorized by a government telecommunication authority, such as Federal Communications Commission (FCC) and may be disabled on certain authorized devices.

The network may enable or disable this data sniffing function in the UE at any time. In one alternative, the data sniffing could be done in real-time manner. For example the data exchanged over the inter-device communication link could be directly transferred to the network server for analysis. In another example, some properties about the exchanged data over the inter-device communication link may be transferred to the network, e.g., the IDs of the transmitter and receiver, the amount of data, the type of the data, etc. In yet another example, only part of the exchanged data over the inter-device communication link may be transferred to the network server. In yet another example, the exchanged data could be pre-processed and the processed results may be delivered to the network server. The network could configure the data sniffing operations and the parameters to the UE.

In another alternative, the network could pre-configure the data sniffing operations and relevant parameters. The network may also configure the reporting operations and relevant parameters. For example, the network may configure the UE to report all the data calls over the inter-device communication link with the relevant IDs, and to report the data at a particular interval. For example, the reporting period could be set to be daily. The UE then records the data calls over the in-device communication link and report to the server every day. This pre-configuration could be dynamically updated by the network. The network could also define some reporting events. Whenever a reporting event is triggered, the UE could start the corresponding reporting operation. For example, the reporting event could be whenever UE communicates with a particular UE, the exchanged data should be stored and transmitted to the network server. In general, the reporting could be event based or period based. The reporting could also be request-based. For example, whenever there is a request from the network for data sniffing, the UE may perform accordingly. The data sniffing function may be separately defined from the reporting operation.

The network may enable/disable/configure/reconfigure the data sniffing functions in the UE and its relevant parameters. Normally these messages are NAS messages. Further, in some implementation, only one UE involved in the inter-device communication is configured with the data sniffing function while the other UE is not. In some other implementations, both UEs may be configured with the data sniffing function. The user may not be aware that the data sniffing function is running on the UE. The incurred charge to transfer the sniffed data to the network server may not be billed to the user, which makes the operation mostly transparent to the user. However, in some instances, the user may have the choice to disable the data sniffing function in the UE, for example, some particular authorized users. To disable this function, the user may need special password and authority.

Figure 4:
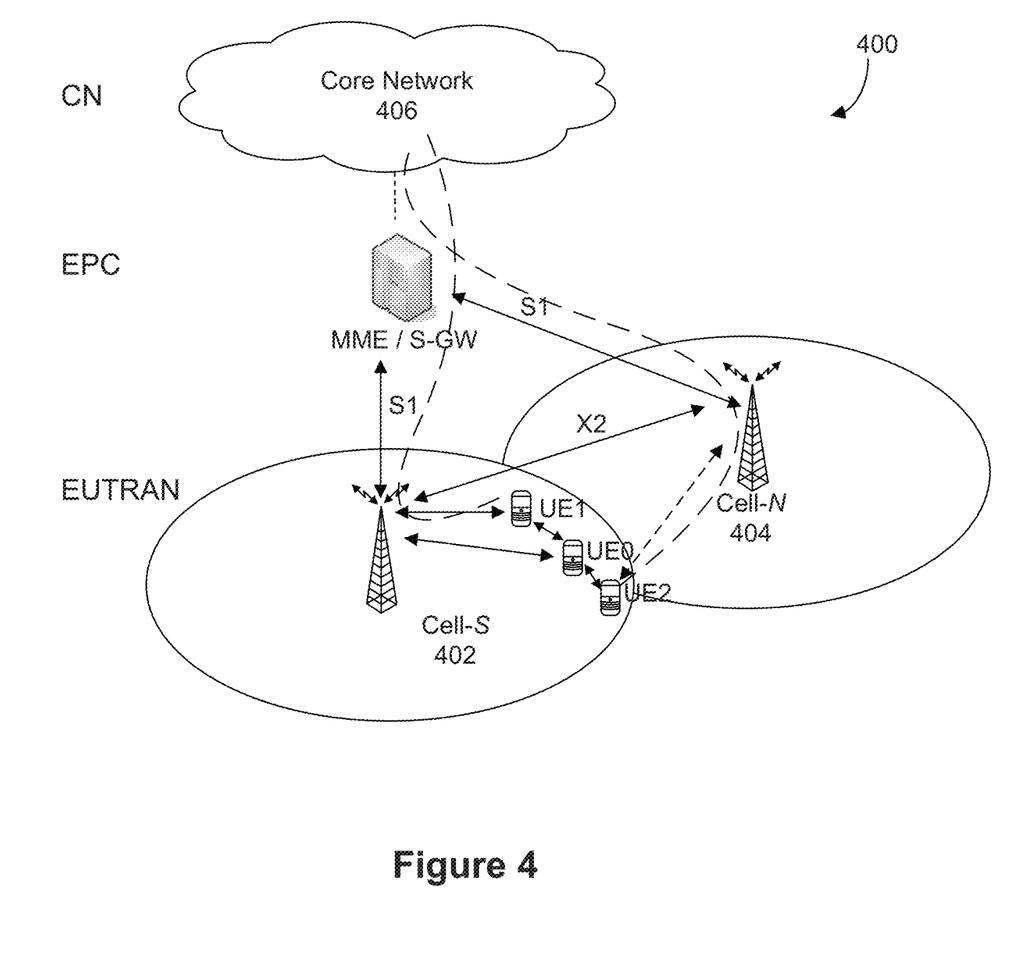
FIG. 4 illustrates an example cellular wireless communication system supporting data sniffing of an inter-device communication link, in accordance with an example of the present disclosure.

FIG. 4 illustrates an example cellular wireless communication system 400 supporting data sniffing of an inter-device communication link, in accordance with an example of the present disclosure. UEs, UE0, UE1 and UE2 are connected to the LTE EPC via Cell-S and Cell-N. UE0 and UE1 are connected to the EPC via Cell-S and UE2 is connected to the EPC via Cell-N. As shown in FIG. 4, data exchanged between devices UE1 and UE0 can be sniffed by the LTE network from either UE1 or UE0 or both via Cell-S 402 and the data can be delivered to a secure server. The data may be encrypted by the device before delivering it to the secure server. Similarly, the data exchanged between UE0 and UE2 can be retrieved from either UE0 via Cell-S 402 or UE2 via Cell-N 404. The sniffed data can be routed to a secure server in the Core Network 406 for further evaluation.

The data sniffing function may be initiated during the inter-device call setup. Generally the activation or deactivation of the data sniffing function is not visible to the user operating the device. Data exchanged during the inter-device call is stored by default in a secure buffer within the device. The secure buffer may be similar to one used to store various encryption and security keys. These secure buffers are not accessible to the user using the device. This data may be stored in a non-volatile memory such as, EEPROM, such that the data is available even after the device loses power, the data is erasable when the timer for data storage expired, and the memory is rewritable when new data arrives. Controls for erasing or rewriting data contained in this memory are not available to the user operating this device, and generally cannot be overridden.

Figure 5:
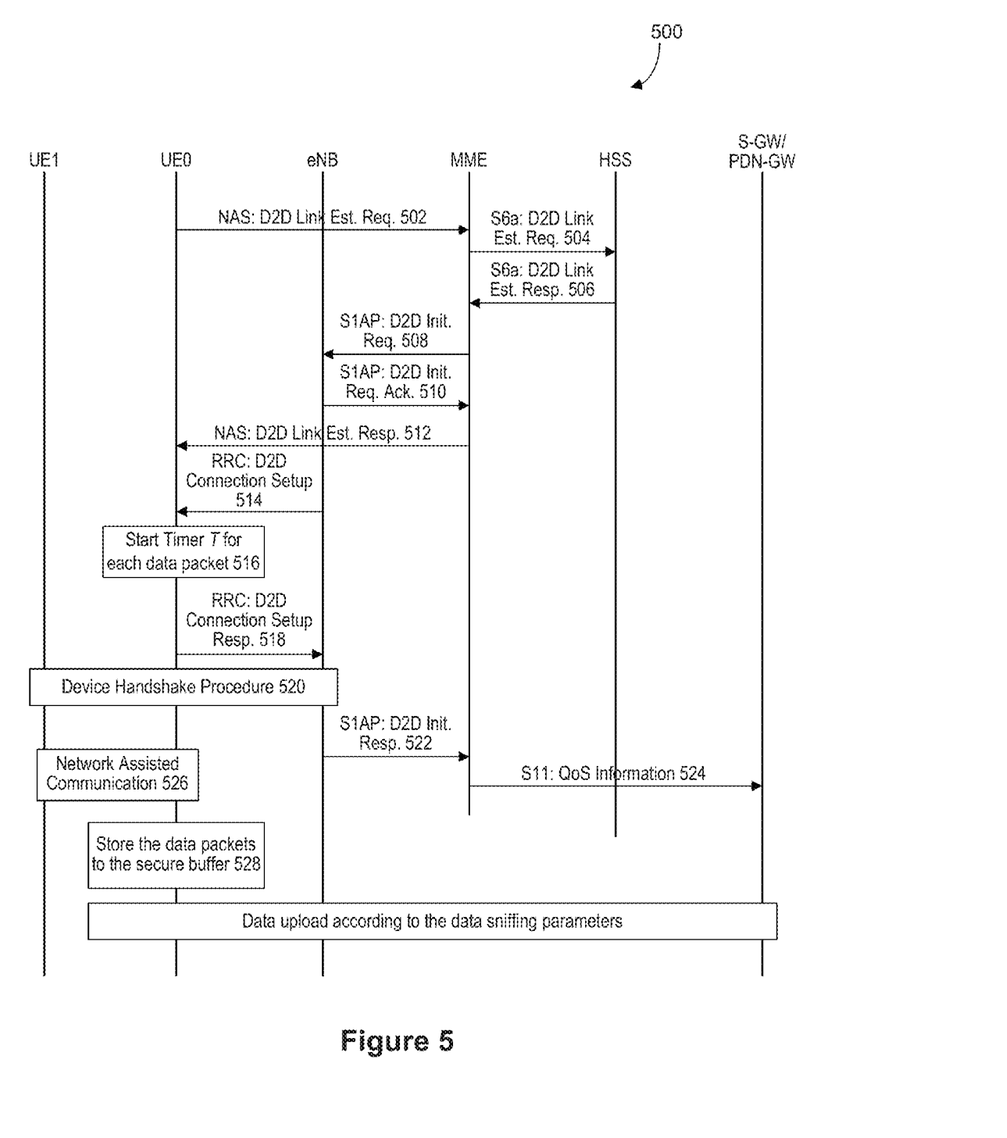
FIG. 5 illustrates a flow diagram of an example method for triggering data sniffing of an inter-device communication link, in accordance with an example of the present disclosure.

FIG. 5 illustrates a flow diagram of an example method 500 for triggering data sniffing of an inter-device communication link, in accordance with an example of the present disclosure. In the illustrated example, a network entity may receive a non-access stratum (NAS) request message from a user equipment (UE) for initiating an inter-device communication link; and send a NAS response message to the UE for establishing the inter-device communication link, the NAS response message including one or more data sniffing related parameters corresponding to the inter-device communication link. A UE may receive a NAS message from a network entity, the NAS message including one or more data sniffing related parameters corresponding to an inter-device communication link; store data exchanged over the inter-device communication link in a buffer; and upload the stored data to a secure server in a network.

As shown in FIG. 5, UE0 sends a NAS message to a MME via the serving eNB to initiate a direct D2D link with UE1 at 502. As an example, the NAS message to initiate the direct D2D link with other UEs may be called a D2D Link Establishment Request message. The D2D Link Establishment Request message may include specific information for the direct communication link, for example, bandwidth requirements, data rate information, quality of service (QoS) information, time duration, etc., for the direct inter-device communication link. The NAS message may also include information of the other UE involved in the direct inter-device communication link. For example, the NAS message may include the UE identification (ID) information of the other UE, i.e., UE1, in the illustrated example. The UE ID may be, e.g., a phone number or the device PIN number etc.

After receiving the NAS message from UE0, the MME may forward the UE request to the HSS in a D2D Link Establishment Request message at 504. The communication interface between the MME and the HSS may be referred to as an S6a interface. The MME may also include information about the UE in the D2D Link Establishment Request message sent to the HSS at 504.

After receiving the message from the MME, the HSS may check the QoS requirements requested by the UE for the inter-device communication link and send a D2D Link Establishment Response message to the MME at 506. HSS may check the device capabilities to verify whether the UE/device is authorized to establish a direct inter-device communication link with another device. If the UE is authorized to communicate directly with another UE, the UE may support the data sniffing functionality. If the HSS responds negatively to the MME, the MME may send a NAS D2D Link Establishment Response message to UE0 with a negative acknowledgment, indicating an unsuccessful establishment of the inter-device communication link. In the NAS message, the MME may also indicate the cause for the rejection. Consequently, UE0 may re-initiate the inter-device communication link based on the cause.

If the HSS responds positively to the MME at 506, indicating an acceptance of the UE0's request for a direct communication link with UE1, the MME may subsequently send a D2D Initialization Request message to UE0's serving eNB at 508 for enabling the direct communication link between UE0 and UE1. The communication interface between the MME and the eNB is referred to as an S1 interface. The MME may include the QoS requirements of the direct communication link between UE0 and UE1 in the D2D Initialization Request message. The eNB may check the QoS requirements of the requested inter-device link and available radio resources at the eNB. The eNB may then determine whether the direct communication link between UE0 and UE1 can be enabled based on the QoS requirements with the available radio resources. The D2D Initialization Request message at 508 may also include information about the data sniffing function. For example, this message may include an indication whether or not data sniffing is enabled, whether or not data packet sniffing is enabled at multiple devices, etc. If data filtering is enabled, specifics of the data filtering function may also be included in this message. The Serving eNB may consider this information to determine the radio resources required to support this inter-device call. Correspondingly, the eNB may send a D2D Initialization Request Acknowledgement message to the MME at 510, including a positive or negative acknowledgement. The eNB may include reasons for rejecting the D2D initialization request in the D2D Initialization Request Acknowledgement message when a negative acknowledgement is sent to the MME.

If the MME receives a positive acknowledgement from the eNB at 510, the MME may send a D2D Link Establishment Response message with a positive acknowledgment to UE0 at 512, indicating an acceptance of the request from UE0 to initiate a direct communication link with UE1. The NAS D2D Link Establishment Response message may also include an identification for the D2D link and one or more data sniffing related parameters corresponding to the inter-device communication link, such as indicators indicating the enablement of data sniffing, timers for uploading the data exchanged over the inter-device communication link, the secure server descriptor, data filtering functions, and so on. For example, the message may indicate a limit on the length of time the transmitted packets should be stored in the buffer. After the timer expires the stored packets can be erased and new packets can be stored. It may be the responsibility of the network to request the data to be uploaded to the server before the timer expires. In another scenario, the message may indicate the time intervals in which the stored packets have to be uploaded to the server. In another scenario, the network may also indicate that device should forward a compressed version of the data packets. For example, the packet may be searched for specific words or sentences according to predefined rules and the result of that search may be uploaded to the server.

In addition to these timers which define the times for uploading the data exchanged over the direct inter-device communication link, the network may also send a special encryption key to the device. The device may encrypt the stored data before sending it to the secure server. The encryption key and/or timer may be updated any time after initiating the inter-device call. Other NAS messages may also be used to transmit the data sniffing related parameters to the UE. For example, the data sniffing related parameters may be transmitted to the UEs after the data exchange over the inter-device communication link has started. In some implementations, the network may also send updated data sniffing related parameters to the UEs after the data exchange over the inter-device communication link has started. The D2D Link Establishment Response message 512 may also be sent to UE1 if the network decides to sniff the data from UE1 instead of, or in addition to, from UE0. If the NAS message at 512 does not contain the data sniffing descriptors, the UE may assume that the data need not be stored in the secure buffer and uploaded to a secure server.

When the eNB determines that the direct communication link between UE0 and UE1 may be enabled, the eNB may send RRC message D2D Connection Setup to UE0 at 514. The eNB may use the Cell radio network temporary identity (C-RNTI) of UE1 to send this RRC message to UE1 at 514. The D2D Connection Setup message may include transmission parameters for the direct communication link, such as a C-RNTI of UE1, temporary transmit point identifications for each UE communicating over the inter-device communication link, minimum and maximum transmit power levels for transmitting over the inter-device communication link, a device-to-device radio network temporary identity (DD-RNTI) for identifying the direct inter-device link, a transmit power step for the direct inter-device link, a guard time for the direct inter-device link, etc.

After receiving the RRC D2D Connection Setup message, the UE starts a timer T at 516. In the NAS D2D Link Establishment Response message, the MME may include a device-to-device identification (D2D-ID), $T_{dump}$, $T_{send\_min}$, $T_{send\_max}$, and the secure server descriptor in the message. The D2D-ID is a unique ID for the D2D communication link. $T_{dump}$ is a timer for dumping the IP packets exchanged between the devices which are stored in a secure location within the device. $T_{send\_min}$, $T_{send\_max}$ are timers indicating time limits for uploading the data to a secure server in the network. The message may include either $T_{send\_min}$, $T_{send\_max}$ or $T_{dump}$. $T_{send\_max}$ indicates the maximum time delay for the data exchanged between the devices to be uploaded to the secure server and $T_{send\_min}$ indicates the minimum time delay for the data exchanged between the devices to be uploaded to the secure server. When $T_{send\_min}$, $T_{send\_max}$ is not included in the NAS D2D Link Establishment Response message, the UE may assume that the network may request data transfer at a later time before the timer $T_{dump}$ expires. Once the timer $T_{dump}$ expires, the data stored in the secure buffer may be erased. The secure server descriptor may include all the relevant information to access and upload the data to the secure server. The secure server descriptor may include, the IP address of the server, an encryption key for encrypting the data for upload, etc. In case of any power interruptions to the device the stored data may be uploaded to the secure server after device powers-up. In another alternative, the timer T may be started for each data packet.

Subsequent to starting the timer T at 516, UE1 may send a D2D Connection Setup Response message to the eNB at 518, indicating a successful reception of the D2D Connection Setup message. In some implementations, the eNB may also send an RRC message D2D Connection Setup to UE1 which includes the similar information such as DD-RNTI. Subsequent to receiving the D2D Connection Setup message from the eNB, UE1 may also send a D2D Connection Setup Response message to the eNB, indicating a successful reception of the D2D Connection Setup message.

After receiving the D2D Connection Setup Response message from both UE1 and UE1 or the UE which initiated the D2D call, i.e. UE0, the eNB may initiate a device handshake procedure with UE1 and UE1 at 520. During this procedure, the UEs identify each other and initiate link parameter tuning such that a reliable communication link can be established between the UEs. The transmit parameters, such as transmit power, modulation and coding scheme, etc, for direct inter-device communication link are obtained during this step. For example the transmit power for this link may be set such that the transmission from the UEs does not interfere with ongoing network-device communications and other device-to-device communication links.

Upon successful completion of the device handshake procedure, the eNB may send a D2D Initialization Response message to the MME at 522, indicating a completion of the device handshake procedure. Subsequently, the MME may communicate QoS requirements of the direct inter-device link to the S-GW at 524. Upon successful completion of the device handshake procedure, the eNB may also determine and communicate specifics regarding resources to be used for the inter-device link to UE1 and UE1. The network assisted inter-device communication between UE1 and UE1 may then be conducted over the direct inter-device communication link at 526.

The UE may store data packets transmitted or received over the direct inter-device communication link in a secure buffer at 528. The size of the buffer may depend on the type of application, the timers set by the network, etc. In general a maximum size of the buffer may be defined, e.g., in relevant standards documents (for the UEs supporting the direct inter-device communication) and the timers at the network may be set based on the required QoS and the available buffer size at the UE. This may also depend on the number of simultaneous inter-device calls a UE is participating. To reduce the size of the buffer required at a UE, the network may only indicate that either the transmitting or receiving UE is to store the data packets. To further reduce the size of buffer, the network may indicate that a filtered version or a representation of the data packets to be stored and transmitted to a secure server. For example, the filter can be a word look up in the data packets. These compressed statistics related to the data packets can be sent with very less radio resources to the secure server. Alternatively, the data packets which don't pass the security-sensitivity test, may be stored and an alert may be sent to the secure server. The secure server may, in turn, ask for the full data packet for further evaluation. The UE may upload the stored data to a secure server in a network periodically or upon receiving a request from the network. For example, when the timer T is greater than the value of $T_{send\_min}$, the UE may set up uplink transmission and data transfer to the secure server in the network at 530. If $T_{send}$ is included in the NAS message, and If T>$T_{send\_min}$: The UL transmission is setup, and data is transferred to a secure server in the network until T=$T_{send\_max}$, at which point the buffer and timer are reset. If $T_{dump}$ is included in the NAS message and If T≥$T_{dump}$: the stored data packets are deleted and the buffer may be overwritten with new data packets. The timer T is also reset. If T<$T_{dump}$: If a NAS message is received to upload the data to the server, UE may start uploading the data to the server until T=$T_{dump}$.

In some implementations consistent with the present disclosure, the network may access the exchanged data by sending a NAS data retrieving message to the UE for triggering the UE to upload data stored in the secure buffer to the secure server. Then the UE may send the data stored in the secure buffer within the UE to the secure server via the S-GW upon receiving such message from the network. The UE may obtain the required UL radio resource grant to upload the data to the secure server. The network may indicate to the serving eNB that the data sniffing function is enabled. The serving eNB may include this requirement in the radio resource reservation for the UEs in the direct communication. The serving eNB may determine whether the same data is to be sniffed from multiple devices or from just one device in reserving the radio resources. The serving eNB may also consider whether the actual data packets, or a filtered version of the data packets, are to be uploaded. The specifics of the data filtering function may be indicated by the network to the serving eNB and the UEs. Various data filtering functions may be defined in the standards and the index of the data filtering function may be included in the NAS message and the D2D Init Request message to the eNB.

This data transfer procedure between the UE and the secure server may be transparent to the user. In other words, the user of the UE should not be able to notice, or to interrupt this data transfer. The device supporting the data sniffing functionality may automatically send a request for UL radio resource grant such that the data can be uploaded before $T_{send\_max}$ expires. In addition the data may be automatically erased after a predetermined time period so as to prevent any memory overflow problems within the secure buffer location. If the UE is in an RRC_IDLE state, the network may send appropriate RRC messages to bring the UE into a RRC_ACTIVE state.

To establish a secure communication over the inter-device link, the data exchange over the inter-device link may be encrypted. For example, the serving eNB may derive an additional encryption key $K'_{eNB}$ for the inter-device link. The serving eNB may send the additional encryption key $K'_{eNB}$ to all the UEs participating in the inter-device communication, in the already encrypted and integrity protected RRC message over the eNB-to-UE link. This encryption key may then be used for the inter-device communication. This key may not be refreshed during the call unless the parent key is refreshed.

The systems and methods described above may be implemented by any hardware, software or a combination of hardware and software having the above described functions. The software code, either in its entirety or a part thereof, may be stored in a computer readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Method steps may be implemented in an order that differs from that presented herein.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. Although certain illustrated examples in this disclosure may show only two UEs, the described systems and methods for the inter-device communications can be applied to more than two UEs without departing from the scope of the present disclosure.

What is claimed is:

1. A method at a user equipment (UE), comprising:
receiving a non-access stratum (NAS) message from a network entity to establish an inter-device communication link, the NAS message including one or more data sniffing related parameters corresponding to the inter-device communication link, wherein the one or more data sniffing related parameters includes information for storing data exchanged over the inter-device communication link with another UE;
storing the data exchanged with the another UE over the inter-device communication link in a buffer based on the one or more data sniffing related parameters; and
uploading the stored data to a secure server in a network.

2. The method of claim 1, wherein the one or more data sniffing related parameters include a timer indicating a time limit for uploading the stored data to the secure server.

3. The method of claim 1, wherein the one or more data sniffing related parameters include a timer indicating a time limit for storing the data in the UE before the UE starts to dump the data.

4. The method of claim 1, further comprising:
sending a NAS inter-device link establishment request message to the network entity, prior to receiving the NAS message from the network entity.

5. The method of claim 1, wherein the UE starts a timer upon receiving the NAS message from the network entity.

6. The method of claim 1, wherein the one or more data sniffing related parameters include a descriptor for the secure server.

7. The method of claim 1, wherein the buffer is inaccessible to users using the UE.

8. The method of claim 1, wherein a device-to-device identification is included for the inter-device communication link when uploading the stored data to the secure server.

9. The method of claim 1, further comprising:
erasing the stored data in the buffer.

10. The method of claim 9, wherein the stored data in the buffer is erased a predetermined time period after uploading the stored data to the secure server.

11. The method of claim 1, wherein the UE maintains an active communication link with an associated base station when exchanging data over the inter-device communication link.

12. The method of claim 1, wherein the data exchanged over the inter-device communication link is encrypted and the encryption for the inter-device communication link is different from an encryption of a communication link between the UE and its serving base station.

13. A method at a network entity, comprising:
receiving a non-access stratum (NAS) request message from a user equipment (UE) for initiating an inter-device communication link; and
sending a NAS response message to the UE for establishing the inter-device communication link, the NAS response message including one or more data sniffing related parameters corresponding to the inter-device communication link, wherein the one or more data sniffing related parameters includes information for storing data exchanged over the inter-device communication link, and the UE stores the data exchanged with another UE over the inter-device communication link in a buffer based on the one or more data sniffing related parameters.

14. The method of claim 13, wherein the one or more data sniffing related parameters include a timer indicating a time limit for uploading the data exchanged over the inter-device communication link from the UE to a secure server.

15. The method of claim 13, wherein the one or more data sniffing related parameters includes a timer for dumping data exchanged over the inter-device communication link in the UE.

16. The method of claim 13, wherein the one or more data sniffing related parameters includes a descriptor for a secure server.

17. The method of claim 16, wherein the descriptor includes information to access and upload the data exchanged over the inter-device communication link to the secure server.

18. The method of claim 13, wherein the network entity is a mobility management entity (MME).

19. The method of claim 13, wherein the one or more data sniffing related parameters includes a device-to-device identification for the inter-device communication link.

20. The method of claim 13, further comprising:
forwarding the request for initiating the inter-device communication link from the UE to a subscriber server; and
receiving a response from the subscriber server for establishing the inter-device communication link.

21. The method of claim 13, further comprising:
sending a NAS data retrieving message to the UE, the message configured to cause the UE to upload data stored in a buffer to a secure server, wherein the data stored in the buffer includes the data exchanged over the inter-device communication link.

22. The method of claim 13, further comprising:
sending a NAS data dumping message to the UE, the message configured to cause the UE to dump the stored data in a secure buffer, wherein the stored data in the secure buffer includes the data exchanged over the inter-device communication link.

23. A user equipment (UE) configured to:
receive a non-access stratum (NAS) message from a network entity to establish an inter-device communication link, the NAS message including one or more data sniffing related parameters corresponding to the inter-device communication link, wherein the one or more data sniffing related parameters includes information for storing data exchanged over the inter-device communication link with another UE;
store the data exchanged with the another UE over the inter-device communication link in a buffer based on the one or more data sniffing related parameters; and
upload the stored data to a secure server in a network.

24. The user equipment of claim 23, wherein the one or more data sniffing related parameters include a timer indicating a time limit for uploading the stored data to the secure server.

25. The user equipment of claim 23, wherein the one or more data sniffing related parameters include a timer indicating a time limit for storing the data in the UE before the UE starts to dump the data.

26. The user equipment of claim 23, further configured to:
send a NAS inter-device link establishment request message to the network entity, prior to receiving the NAS message from the network entity.

27. The user equipment of claim 23, wherein the UE starts a timer upon receiving the NAS message from the network entity.

28. The user equipment of claim 23, wherein the one or more data sniffing related parameters include a descriptor for the secure server.

29. The user equipment of claim 23, wherein the buffer is inaccessible to users using the UE.

30. The user equipment of claim 23, wherein a device-to-device identification is included for the inter-device communication link when uploading the stored data to the secure server.

31. The user equipment of claim 23, further configured to:
erase the stored data in the buffer.

32. The user equipment of claim 31, wherein the stored data in the buffer is erased a predetermined time period after uploading the stored data to the secure server.

33. The user equipment of claim 23, wherein the UE maintains an active communication link with an associated base station when exchanging the data over the inter-device communication link.

34. The user equipment of claim 23, wherein the data exchanged over the inter-device communication link is encrypted and the encryption for the inter-device communication link is different from an encryption of a communication link between the UE and its serving base station.

35. A network entity configured to:
receive a non-access stratum (NAS) request message from a user equipment (UE) for initiating an inter-device communication link; and
send a NAS response message to the UE for establishing the inter-device communication link, the NAS response message including one or more data sniffing related parameters corresponding to the inter-device communication link, wherein the one or more data sniffing related parameters includes information for storing data exchanged over the inter-device communication link, and the UE stores the data exchanged with another UE over the inter-device communication link in a buffer based on the one or more data sniffing related parameters.

36. The network entity of claim 35, wherein the one or more data sniffing related parameters include a timer indicating a time limit for uploading the data exchanged over the inter-device communication link from the UE to a secure server.

37. The network entity of claim 35, wherein the one or more data sniffing related parameters includes a timer for dumping data exchanged over the inter-device communication link in the UE.

38. The network entity of claim 35, wherein the one or more data sniffing related parameters includes a descriptor for a secure server.

39. The network entity of claim 38, wherein the descriptor includes information to access and upload the data exchanged over the inter-device communication link to the secure server.

40. The network entity of claim 35, wherein the network entity is a mobility management entity (MME).

41. The network entity of claim 35, wherein the one or more data sniffing related parameters includes a device-to-device identification for the inter-device communication link.

42. The network entity of claim 35, further configured to:
forward the request for initiating the inter-device communication link from the UE to a subscriber server; and
receive a response from the subscriber sewer for establishing the inter-device communication link.

43. The network entity of claim 35, further configured to:
send a NAS data retrieving message to the UE, the message configured to cause the UE to upload the data stored in the buffer to a secure server, wherein the data stored in the buffer includes the data exchanged over the inter-device communication link.

44. The network entity of claim 35, further configured to:
send a NAS data dumping message to the UE, the message configured to cause the UE to dump stored data in a secure buffer, wherein the stored data in the secure buffer includes the data exchanged over the inter-device communication link.

* * * * *

UNITED STATES PATENT AND TRADEMARK OFFICE
CERTIFICATE OF CORRECTION

PATENT NO. : 9,137,836 B2
APPLICATION NO. : 13/652011
DATED : September 15, 2015
INVENTOR(S) : Chandra Sekhar Bontu, Yi Song and Zhijun Cai It is certified that error appears in the above-identified patent and that said Letters Patent is hereby corrected as shown below:

In the claims

Column 14, Line 62, In Claim 42, delete "sewer" and insert -- server --, therefor.

Signed and Sealed this
Fifth Day of April, 2016

Michelle K. Lee
*Director of the United States Patent and Trademark Office*